June 12, 1951 F. T. BARR 2,556,835
PROCESS FOR PRODUCING GAS MIXTURES
Filed Dec. 29, 1945
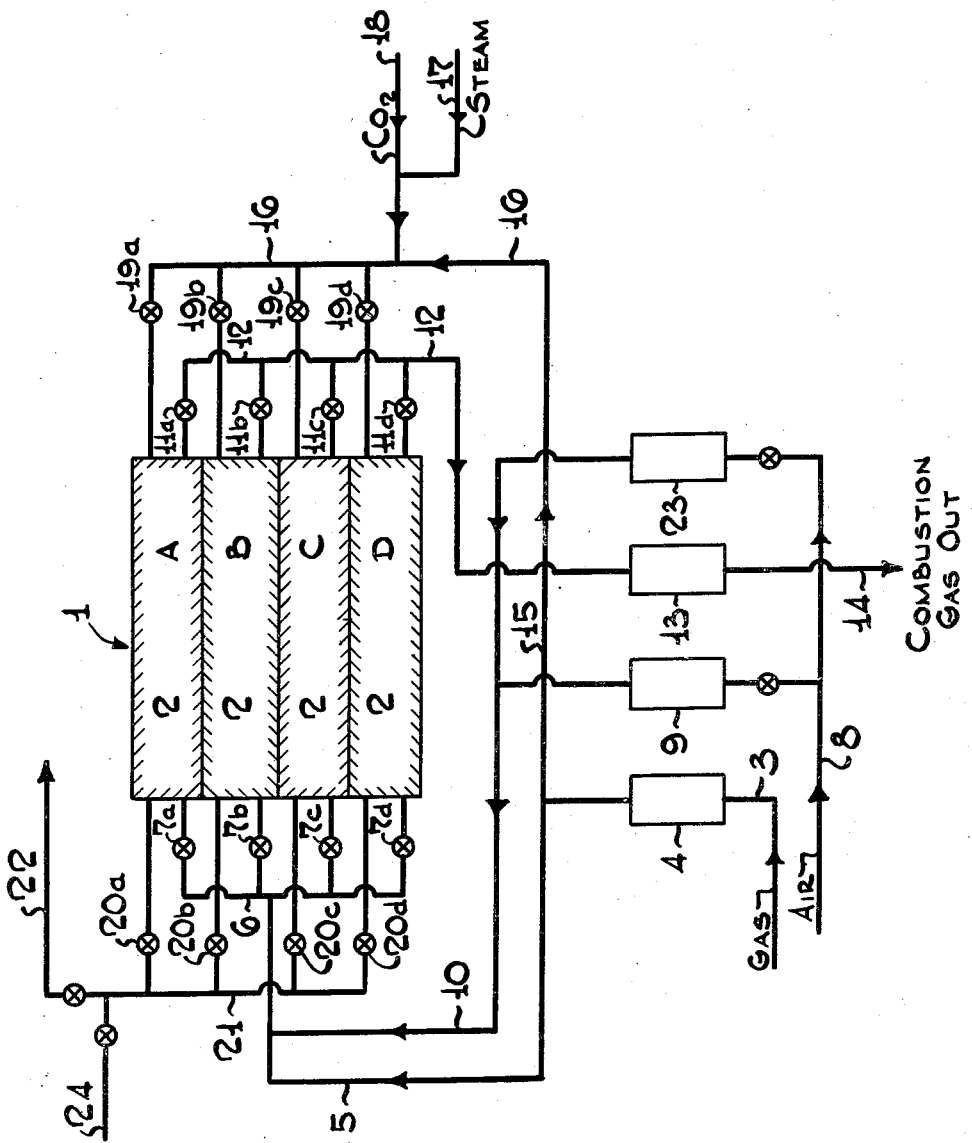
Frank T. Barr Inventor
By P. L. Young Attorney Patented June 12, 1951

2,556,835

UNITED STATES PATENT OFFICE 2,556,835

PROCESS FOR PRODUCING GAS MIXTURES

Frank T. Barr, Summit, N. J., assignor to Standard Oil Development Company, a corporation of Delaware Application December 29, 1945, Serial No. 638,423

4 Claims. (Cl. 48—196)

The present invention relates to the production of hydrogen gas from hydrocarbons by reforming with agents such as steam and carbon dioxide or to the production of mixtures of hydrogen and carbon monoxide, and particularly to a method for obtaining these gases under pressure for industrial use. The invention will be fully understood from the following description and drawing.

The drawing is a diagrammatic view of an apparatus for conducting the process, showing the paths of flow of the gases and the piping arrangement.

For many industrial purposes it is desirable to produce hydrogen or a mixture of hydrogen and carbon oxides from hydrocarbons under pressure. Heretofore this has generally been brought about by producing the gases at atmospheric pressure and subsequently compressing the mixture. It has been pointed out that compression costs are an important item and are roughly proportional to the ratio of the initial and the final pressures, so that, in effect in producing gas at 50 atmospheres of pressure, the compression cost of going from 1 to 7 atmospheres, is as great as going from 7 to 50 and in consequence any method for cheaply obtaining the first few multiples of the original pressure effects a very important saving. One way in which a saving can be obtained is to compress the hydrocarbon gas and to conduct the reforming under pressure instead of reforming at low pressure and then compressing, but pressure reforming must be carried out at temperatures above those at which reforming is ordinarily accomplished at ordinary pressure and this has discourage the use of this suggestion.

One object of the present invention is to devise a process for cheaply producing hydrogen or mixtures of hydrogen and carbon monoxide from hydrocarbons under pressure. Other objects will be apparent to those skilled in the art.

Referring to the drawing, numeral 1 denotes diagrammatically a regenerative reformer or, more properly, a combination of four regenerative reformer units which are shown together as a single block. The individual units are denoted by the letters A, B, C and D respectively. It will be understood that these units may be constructed in any desired manner, either together as shown or as separate units. It will also be understood that there should be at least two of such units but it is preferable to provide a greater number, say 4, 6 or even 10 or 12 for large productions.

These reformer units are provided with a large heat capacity and fitted with passageways for hot gas to pass therethrough, so as to give up heat in raising the temperature of the packing material in a heating cycle and to give up this heat to cooler gases passing through the said passageways on a subsequent reforming cycle, whereby the cooler gas is furnished reaction heat for reforming. The heat storage material, that is to say material of large heat capacity, within the units A to D respectively may be made of metal or ceramic materials in the form of bricks or other shapes preferably of large surface and is arranged in any desired manner providing passageways through which the gases may pass. The passageways are not specifically shown in the drawing but the material of large heat capacity is denoted generally by the numeral 2. It will be understood that these units are adapted for operation at high pressure of the order of 10 to 50 atmospheres and for this reason must be surrounded by a strong wall of structural steel which is in turn insulated by a thick layer of insulating material within the pressure bearing walls.

Natural or hydrocarbon gas or vapor is supplied by a pipe 3 and is compressed by a compressor 4 whence it passes by a line 5 to a fuel manifold 6, which in turn feeds the separate units A to D inclusive through separate valved lines 7a, 7b, 7c and 7d. Air is supplied by a pipe 8 and it is likewise compressed in the compressor 9 and fed to the manifold 6 so that it can be supplied along with the hydrocarbon gas for combustion. The combustion products after passing through the brick work passageways in the various units A to D leave by separate valved exhaust lines 11a to 11d and thence to a manifold 12 and to an exhaust gas turbine 13. The gas is finally discharged at low pressure at 14.

The apparatus described above applies most particularly to the heating cycle by which the units A to D are raised to the high temperature required for the subsequent reforming operation and it will be understood that the cycles of the several units are staggered or out of phase, so to speak, one or more of the units being on the heating cycle while others are employed for reforming. After the temperature has been raised in those units being heated, suitable valves, to be described, will be switched so that the combustible gases now pass to the other units which are in turn raised to the temperature for reforming, just as disclosed above.

Gas to be reformed is taken by pipe 15 to a gas feed manifold 16 to which steam or carbon dioxide is likewise supplied by the pipes 17 and 18. This gas mixture to be reformed is supplied by separate valved lines 19a to 19d and the reformed mixtures are withdrawn by the valved pipes 20a to 20d to the manifold 21 and thence are delivered under pressure to the product gas line 22. From the above explanation it can be seen that some of the reformer units will be in the process of being heated while similar units will be employed for reforming, at all times, so that the flow of combustion gas and product gas will be substantially uniform at all times and the various valves are simultaneously, preferably automatically reversed from time to time to enable the several units to be operated according to a predetermined schedule of the heating and reforming stages of the cycle. The combustion gas turbine 13 is employed to supply all or part of the power for the gas compressor 4 and the air compressor 9 and turbine 23 is employed as a spare and for starting up.

After the reforming period it is desirable to purge the system of hydrogen before beginning the combustion period. This is conveniently accomplished by allowing the steam from 17 to pass through the reformer unit for a short time. The purged gases pass out by 24 to a stack not shown.

To illustrate the arrangement of the cycle, let us assume that the unit A has been heated and is now ready for the reforming stage of the cycle. Unit B is in mid-course of the reforming stage while C is just completing its reforming period. D is in the midst of its reheating period. At this point valves 7a and 11a will be closed, while valves 19a and 20a will be opened. Thus the unit A will be switched from the heating to the reforming stage. The valves for units B and D will not be changed at this time; valves 7b and 11b are in the closed position, 19b and 20b are in the open position, 7d and 11d are in the open position while 19d and 20d are in the closed position. Valves 7c and 11c of unit C will be opened and simultaneously 19c and 20c will be closed. Thus the unit C will be switched from the reforming portion of the cycle over to reheating. In effect, units A and C have been switched; the one for heating to reforming and the other for reforming to reheating.

In the above manner the valves are opened and closed at stated intervals around a cycle which may be from 2 to 10 minutes, depending on the size of the units, and it is preferred that the valves be operated by automatic means, all being coordinated as will be understood. It will be further understood that although the above describes operation with substantially equal length reforming and heating periods, suitable schedules may be arranged for unequal periods, still maintaining uniform flow of total gas produced. For safety in operation, it will also be necessary to introduce purge periods not described above, but which are known in the art.

In studying the present process, it is found that substantial economies can be made by carrying out the reforming process under pressure of from 3 to 50 atmospheres in a process of alternating cycles, wherein the regenerator preferably containing catalytic material is first heated to a reforming temperature by direct combustion with fuel and air. This fuel may be a portion of the gas to be reformed or it may be fuel from an entirely separate source. Subsequently, the reforming is accomplished in the heat regenerator, employing the heat stored during the combustion stage to effect the reforming reaction with steam and carbon dioxide. Both of the heating and reforming steps are conducted under the same superatmospheric pressure, preferably of the order of 5 to 50 atmospheres. In this manner the product gas is delivered under pressure as desired and the units are maintained throughout at substantially the same pressure, without being subjected to destructive variations from high pressure to low pressure. This is accomplished by conducting the combustion or heating under substantially the same pressure as the reforming. Since combustion is carried out under pressure, the combustion gas is delivered at substantially the same pressure and the heat or energy of this gas can be utilized to supply energy for compressing not only air but also the gas to be reformed.

The reforming units ordinarily operate over a range of from 1600° F. to 2500° F., preferably 2000 to 2200° F.; that is to say, they are heated to the latter temperature and operated on the reformer cycle until the temperature is dropped to the lower temperature given.

The heat storing mass is arranged within the reformer units to provide passageways through which the gas can be passed and provides a large mass so that a substantial amount of heat may be stored. The cycles may be conveniently from 2 to 30 minutes and 100 pounds of brick work are ordinarily provided for from 10 to 50 cubic feet of free natural gas fed per cycle, depending on the temperature range.

These heat storing materials may be metallic or they may be made of ceramic materials. They need not be catalytic although in this case somewhat higher temperatures are used than if catalytic materials are added. Ordinary fire brick, for example, can be used or alumina, Carborundum, silica and the like. Catalytic materials may be employed and either incorporated into the brick work itself or attached to its outer surface. For this purpose metals and metal oxides of the 8th group of the catalytic table are ordinarily preferred such as nickel, cobalt and iron oxides.

The reforming is carried out in the presence of a suitable reforming agent of which two, carbon dioxide and steam, may be mentioned. The reforming is thus a reaction between, for example, steam and the hydrocarbon by which carbon monoxide and hydrogen are produced with a minor amount of carbon dioxide. An analogous reaction occurs with carbon dioxide. With a given hydrocarbon such as natural gas, which is mainly methane, steam will produce a gas which is substantially three parts of hydrogen to one of carbon monoxide while carbon dioxide used as the reforming agent produces a gas containing about 1:1. It is thus possible to vary the composition of the reformed gas by using steam and carbon dioxide in different proportions.

The following example is given, showing more specifically the operations of a unit of the above design:

*Example*

The design for a large capacity regenerative reformer consists of 10 separate units each of which is a cylindrical vessel adapted to operate at 300 pounds per sq. in. The outside diameter is approximately 14 feet with an outer pressure resisting wall and an inner insulating layer of 18" of fire brick and other insulation leaving an effective inside diameter of 11 feet. The overall height of each unit is approximately 30 feet including 20 feet of space for the regenerating ceramic material. This consists of 5,000 pounds of material crushed and graded to 1 to ½ inch diameter and is impregnated with a suitable nickel salt.

In operating a single unit is heated by burning approximately 2000 cu. ft. of natural gas (measured at normal pressure) with about 20,000 cu. ft. of air at 300 pounds/sq. in. In this manner the brick work is raised from 1900 to 2100° F. completing the heating stage.

During reforming 5200 cu. ft. of natural gas is passed through a reformer unit with 3800 cu. ft. of steam and 1900 cu. ft. of $CO_2$. Reforming is accomplished at 300#/sq. in. and 19,000 cu. ft. of reformed gas is produced per cycle. It has a composition of approximately 2 vol. $H_2$ to 1 of CO. The temperature drops from 2100 to 1900° during this stage. A short purge with steam is employed before reheating.

The above example allows approximately 3 minutes for both heating and reforming stages and with due allowance for purging and valve change, the ten units provided would have a daily capacity of 100 million cu. ft. per day of the product gas.

The gas is delivered at a practically constant rate because of the use of the large number of converters which are operated, out of phase. The gas is delivered at approximately 300 pounds per sq. inch. The amount of energy in this discarded combustion gas, that is, as delivered from the heating cycle is sufficient to compress the hydrocarbon gas and the air required.

I claim:

1. An improved process for converting hydrocarbon gas to hydrogen and an oxide of carbon which comprises compressing air and burning the fuel with said air in at least one of more than two heat regenerative zones for alternate combustion and reforming cycles both operated at substantially the same pressure within the range of 3–50 atmospheres, continuing the combustion until the respective regenerative zone is raised to a reforming temperature while withdrawing combustion products under pressure, utilizing the energy of such combustion products to compress the air, discontinuing combustion and passing hydrocarbon gas along with a reforming agent through said respective regenerative zone under substantially the same pressure whereby hydrogen and an oxide of carbon are produced, discontinuing the passage of the hydrocarbon and the reforming agent when the temperature of said respective zone falls below the reforming temperature, continuing thereafter alternative cycles of combustion and reforming under substantially the same pressure, conducting the same cycles in all of said zones, and operating said cycles out of phase with respect to different zones, in such a manner that a substantially continuous and constant flow of heating exhaust gases is maintained to said utilizing stage.

2. Process according to claim 1 in which the heating and reforming cycles are from 3 to 30 minutes each.

3. Process according to claim 1 in which the heating and reforming stages of the cycle are from 3 to 30 minutes each, and the temperature maintained within the cycle within the range of 1600 to 2500° F.

4. An improved process for converting hydrocarbon gas to hydrogen and an oxide of carbon which comprises compressing air and burning the fuel with said air in at least one of at least four heat regenerative zones for alternate combustion and reforming cycles both operated at substantially the same pressure within the range of 3–50 atmospheres, continuing the combustion until the respective regenerative zone is raised to a reforming temperature while withdrawing combustion products under pressure, utilizing the energy of such combustion products to compress the air, discontinuing combustion and passing hydrocarbon gas along with a reforming agent through said respective regenerative zone under substantially the same pressure whereby hydrogen and an oxide of carbon are produced, discontinuing the passage of the hydrocarbon and the reforming agent when the temperature of said respective zone falls below the reforming temperatures, continuing thereafter alternative cycles of combustion and reforming under substantially the same pressure, conducting the same cycles in all of said zones, and operating said cycles out of phase with respect to different zones, in such a manner that a substantially continuous and constant flow of heating exhaust gases is maintained to said utilizing stage.

FRANK T. BARR.

REFERENCES CITED

The following references are of record in the file of this patent:

UNITED STATES PATENTS

| Number | Name | Date |
|---|---|---|
| 991,179 | Stodolo | May 2, 1911 |
| 1,735,342 | Taylor et al. | Nov. 12, 1929 |
| 1,905,028 | Andrews | Apr. 25, 1933 |
| 2,075,075 | Zeisberg | Mar. 30, 1937 |
| 2,103,453 | Graemiger | Dec. 28, 1937 |
| 2,222,489 | Riggs | Nov. 19, 1940 |
| 2,307,672 | Dunham | Jan. 5, 1943 |
| 2,389,636 | Ramseyer | Nov. 27, 1945 |

FOREIGN PATENTS

| Number | Country | Date |
|---|---|---|
| 290,679 | Great Britain | May 1928 |